US011976740B2

(12) United States Patent
Seidl et al.

(10) Patent No.: US 11,976,740 B2
(45) Date of Patent: May 7, 2024

(54) LIMITED VOLUME COAXIAL VALVE BLOCK

(71) Applicant: VERSUM MATERIALS US, LLC, Tempe, AZ (US)

(72) Inventors: Mason Seidl, Tempe, AZ (US); Meredith Elaine Flickinger, Quakertown, PA (US); Thomas William Piltz, New Tripoli, PA (US); Shawn S. Cable, Allentown, PA (US); David Ebeling, Hamburg, PA (US); Charles Michael Birtcher, Valley Center, CA (US)

(73) Assignee: Versum Materials US, LLC, Tempe, AZ (US)

( * ) Notice: Subject to any disclaimer, the term of this patent is extended or adjusted under 35 U.S.C. 154(b) by 62 days.

(21) Appl. No.: 17/905,247

(22) PCT Filed: Mar. 3, 2021

(86) PCT No.: PCT/US2021/020729
§ 371 (c)(1),
(2) Date: Aug. 29, 2022

(87) PCT Pub. No.: WO2021/183346
PCT Pub. Date: Sep. 16, 2021

(65) Prior Publication Data
US 2023/0098293 A1 Mar. 30, 2023

Related U.S. Application Data

(60) Provisional application No. 62/987,128, filed on Mar. 9, 2020.

(51) Int. Cl.
*F16K 27/02* (2006.01)
*F16K 11/04* (2006.01)

(52) U.S. Cl.
CPC .......... *F16K 27/0263* (2013.01); *F16K 11/04* (2013.01)

(58) Field of Classification Search
CPC .............................. F16K 27/063; F16K 11/04
See application file for complete search history.

(56) References Cited

U.S. PATENT DOCUMENTS

| 4,714,091 A | 12/1987 | Wagner |
| 5,794,659 A | 8/1998 | Duross et al. |
| 5,868,155 A | 8/1999 | Hutton |
| 5,964,230 A | 10/1999 | Voloshin et al. |
| 6,035,893 A | 3/2000 | Ohmi et al. |
| 6,138,691 A | 10/2000 | Voloshin et al. |

(Continued)

FOREIGN PATENT DOCUMENTS

| JP | 2004-186337 A | 7/2004 |
| JP | 2008-057579 A | 3/2008 |

*Primary Examiner* — Kevin R Barss
(74) *Attorney, Agent, or Firm* — Daniel A. DeMarah, Jr.

(57) ABSTRACT

A compact valve block for a chemical container wherein the coaxial valve block has a housing that can accommodate three valve control mechanisms thus allowing for quick and effective purging without the need for an additional external conduit, valves, and coaxial injector. The advantage is a greatly reduced amount of wetted surface area inside the valve block leading to a significant decrease in the time it takes to purge a system thus allowing for quicker times to change chemical containers.

21 Claims, 11 Drawing Sheets

(56) References Cited

U.S. PATENT DOCUMENTS

| | | |
|---|---|---|
| 10,663,072 B2 | 5/2020 | Birtcher et al. |
| 2006/0027281 A1* | 2/2006 | Silva ........................ B08B 9/032 141/63 |
| 2013/0333768 A1 | 12/2013 | Chandrasekharan |
| 2017/0335987 A1 | 11/2017 | Birtcher |

* cited by examiner

LIMITED VOLUME COAXIAL VALVE BLOCK

CROSS-REFERENCE TO RELATED APPLICATIONS

This application is a National Stage filing under 35 U.S.C. 371 of International Patent Application No. PCT/US2021/020729, filed on Mar. 3, 2021, which claims priority to U.S. Provisional Patent Application No. 62/987,128 filed on Mar. 9, 2020. The entire contents of these applications are incorporated herein by reference in their entirety.

BACKGROUND OF THE INVENTION

Various types of chemicals and processes are required in the semiconductor fabrication industry, all while continuous, pure chemical can be supplied at the semiconductor tool request. These requirements necessitate regular and safe chemical container change out processes within the chemical delivery system.

Large piping runs and the presence of deadlegs within the design increase purge time required to safely change these chemical containers while decreasing purging efficiency. Deadlegs refer to sections of chemical delivery system design where purge gas cannot effectively reach, therefore decreasing purging efficiency and safety of the system during chemical container change out and system servicing.

These drawbacks to the chemical delivery system design are amplified by the presence of chemicals with lower vapor pressure and high purity such as tetrakis(dimethylamido) titanium (TDMAT). Chemicals of this kind are historically purged with use of solvent chemical, as disclosed in U.S. Pat. Nos. 5,964,230 and 6,138,691.

The use of a low volume block valve, as described below, will have the ability to remove the solvent purge requirement and use high pressure, high velocity purge gas and internal coaxial line instead. The use of vacuum draw and purge gas evacuation is also included in the block valve design. This low volume block valve has virtually eliminated any deadleg within the purgeable piping design, allowing for improved purging efficiency during chemical container changeouts.

BRIEF SUMMARY OF THE INVENTION

In one aspect, disclosed herein is a valve block comprising: a housing (114) having a first side (116) and a second side (126) opposite the first side (116), wherein the first side (116) comprises a cylindrical depression (118) for receiving a valve control mechanism, wherein the cylindrical depression (118) comprises a surface (120) and a first opening (122) and a second opening (124) in the surface (120), each of which are terminal ends of conduits, wherein the first opening is in fluid communication with a T-connection (146) in fluid communication with a second conduit (148) having a first portion (150) and a second portion (152), wherein the second opening (124) is in fluid communication with a vent opening (178) located on the second side (126) of the housing (114); a third side (128) adjacent to the first side (116) and a fourth side (138) opposite the third side (128), wherein the third side (128) comprises a cylindrical depression (130) for receiving a valve control mechanism, wherein the cylindrical depression (130) comprises a surface (132) and a first opening (134) and a second opening (136) in the surface, each of which are terminal ends of conduits, wherein the first opening (134) is in fluid communication with the first portion (150) of the second conduit (148) and the second opening (136) is in fluid communication with an opening (204) located on the fourth side (138) of the housing (114); a fifth side (140) and a sixth side (142) opposite the fifth side (140), wherein the second portion (152) of the second conduit (148) is in fluid communication with an opening (166) located on the fifth side (140) of the housing (114) through a conduit via a bend portion (162); and an angled seventh side (158) adjacent to the first side (116) and the fourth side (138), wherein the angled seventh side (158) comprises a cylindrical depression (154) for receiving a valve control mechanism, wherein the cylindrical depression (154) comprises a surface (184) and a first opening (174) and a second opening (176) in the surface (184), each of which are terminal ends of conduits, wherein the first opening (174) is in fluid communication with an opening (208) through conduit portion (194) via bend (196) located on the fifth side (140) of the housing (114), the second opening (176) is in fluid communication with the opening (206) located on the second side (126) of the housing (114) through conduit (186) via bend (190) and conduit portion (188).

In another aspect, disclosed herein is a system comprising: a valve block comprising: a housing (114) having a first side (116) and a second side (126) opposite the first side (116), wherein the first side (116) comprises a cylindrical depression (118) for receiving a valve control mechanism, wherein the cylindrical depression (118) comprises a surface (120) and a first opening (122) and a second opening (124) in the surface (120), each of which are terminal ends of conduits, wherein the first opening is in fluid communication with a T-connection (146) in fluid communication with a second conduit (148) having a first portion (150) and a second portion (152), wherein the second opening (124) is in fluid communication with a vent opening (178) located on the second side (126) of the housing (114); a first valve control mechanism located the cylindrical depression (118) of the first side (116); a third side (128) adjacent to the first side (116) and a fourth side (138) opposite the third side (128), wherein the third side (128) comprises a cylindrical depression (130) for receiving a valve control mechanism, wherein the cylindrical depression (130) comprises a surface (132) and a first opening (134) and a second opening (136) in the surface, each of which are terminal ends of conduits, wherein the first opening (134) is in fluid communication with the first portion (150) of the second conduit (148) and the second opening (136) is in fluid communication with an opening (204) located on the fourth side (138) of the housing (114); a second valve control mechanism located the cylindrical depression (130) of the third side (128); a fifth side (140) and a sixth side (142) opposite the fifth side (140), wherein the first portion (150) of the second conduit (148) is in fluid communication with an opening (166) located on the fifth side (140) of the housing (114) via a bend portion (162); an angled seventh side (158) adjacent to the first side (116) and the fourth side (138), wherein the angled seventh side (158) comprises a cylindrical depression (154) for receiving a valve control mechanism, wherein the cylindrical depression (154) comprises a surface (184) and a first opening (174) and a second opening (176) in the surface (184), each of which are terminal ends of conduits, wherein the first opening (174) is in fluid communication with an opening (208) through conduit portion (194) via bend (196) located on the fifth side (140) of the housing (114), the second opening (176) is in fluid communication with the opening (206) located on the second side (126) of the housing (114) through conduit (186) via bend (190) and conduit portion (188); and a third valve control mechanism located the cylindrical depression (154) of the angled seventh side (158).

In yet another aspect, disclosed herein is a method of performing a purge step in a valve block after the valve block has undergone a fluid flow step, wherein the valve block is in fluid communication with a container, the valve block comprising: a housing (114) having a first side (116) and a second side (126) opposite the first side (116), wherein the first side (116) comprises a cylindrical depression (118) for receiving a valve control mechanism, wherein the cylindrical depression (118) comprises a surface (120) and a first opening (122) and a second opening (124) in the surface (120), each of which are terminal ends of conduits, wherein the first opening is in fluid communication with a T-connection (146) in fluid communication with a second conduit (148) having a first portion (150) and a second portion (152), wherein the second opening (124) is in fluid communication with a vent opening (178) located on the second side (126) of the housing (114); a first valve control mechanism located the cylindrical depression (118) of the first side (116); a third side (128) adjacent to the first side (116) and a fourth side (138) opposite the third side (128), wherein the third side (128) comprises a cylindrical depression (130) for receiving a valve control mechanism, wherein the cylindrical depression (130) comprises a surface (132) and a first opening (134) and a second opening (136) in the surface, each of which are terminal ends of conduits, wherein the first opening (134) is in fluid communication with the first portion (150) of the second conduit (148) and the second opening (136) is in fluid communication with an opening (204) located on the fourth side (138) of the housing (114); a second valve control mechanism located the cylindrical depression (130) of the third side (128); a fifth side (140) and a sixth side (142) opposite the fifth side (140), wherein the first portion (150) of the second conduit (148) is in fluid communication with an opening (166) located on the fifth side (140) of the housing (114) via a bend portion (162); an angled seventh side (158) adjacent to the first side (116) and the fourth side (138), wherein the angled seventh side (158) comprises a cylindrical depression (154) for receiving a valve control mechanism, wherein the cylindrical depression (154) comprises a surface (184) and a first opening (174) and a second opening (176) in the surface (184), each of which are terminal ends of conduits, wherein the first opening (174) is in fluid communication with an opening (208) through conduit portion (194) via bend (196) located on the fifth side (140) of the housing (114), the second opening (176) is in fluid communication with the opening (206) located on the second side (126) of the housing (114) through conduit (186) via bend (190) and conduit portion (188), wherein the opening (206) located on the second side (126) of the housing (114) is in fluid communication with a purge gas source (159); and a third valve control mechanism located the cylindrical depression (154) of the angled seventh side (158); the method comprising the steps of: changing the container; engaging the second valve control mechanism to close the first opening (134) in the surface (132) of the cylindrical depression (130) in the third side (128) and to isolate the second opening (136) in the surface (132) of the cylindrical depression (130) in the third side (128); disengaging the first valve control mechanism to open the first opening (122) in the surface (120) of the cylindrical depression (118) in the first side (116) and to open the second opening (124) in the surface (120) of the cylindrical depression (118) in the first side (116); disengaging the third valve control mechanism to open the first opening (174) in the surface (184) of the cylindrical depression (154) in the angled seventh side (158) and to open the second opening (176) in the surface (184) of the cylindrical depression (154) in the angled seventh side (158); and flowing high pressure purge gas through the opening (206) located on the second side (126) of the housing (114) such that the purge gas flows through the second opening (176) in the surface (184) of the cylindrical depression (154) in the angled seventh side (158) then through the first opening (174) in the surface (184) of the cylindrical depression (154) in the angled seventh side (158) to exit the inner coaxial portion (183) of the coaxial conduit and back up the outer coaxial portion (185) of the coaxial conduit through the first opening (122) in the surface (120) of the cylindrical depression (118) in the first side (116) and into the second opening (124) in the surface (120) of the cylindrical depression (118) in the first side (116) to the vent opening (178) located on the second side (126) of the housing (114).

The embodiments of the invention can be used alone or in combinations with each other.

DETAILED DESCRIPTION OF THE INVENTION

Figure 1:
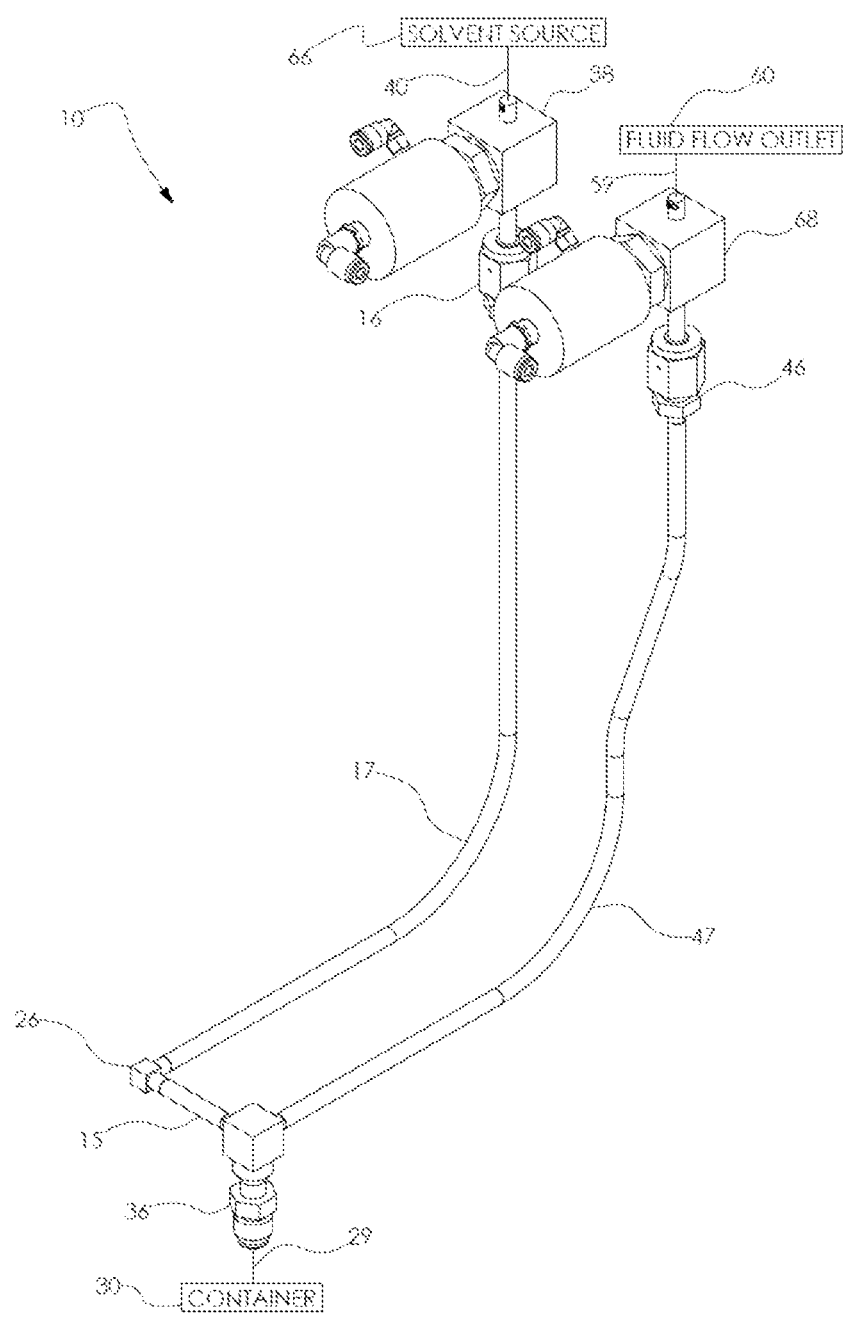
FIG. 1 illustrates a prior art solvent purge system comprising a solvent purge manifold to host container manifold system comprising two independent valves and a coax injector connection.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

For purposes of the present specification and accompanying claims, the term "high velocity purge" means a purge step using a purge gas that is delivered at a rate of 100 liters per minute or greater.

For purposes of the present specification and accompanying claims, the term "conduit" refers to one or more structures through which fluids can be transported between two or more components of a system. For example, conduits can include pipes, ducts, manifolds, and combinations thereof that transport liquids and/or gases at varying pressures throughout a system.

For purposes of the present specification and accompanying claims, the term "fluid flow communication" refers to the nature of connectivity between two or more components that enables liquids and/or gases to be transported between the components in a controlled fashion. Coupling two or more components such that they are in fluid flow communication with each other can involve any suitable method known in the art, such as with the use of flanged conduits, gaskets, and/or bolts.

For purposes of the present specification and accompanying claims, the term "coax" or "coaxial" refers to an arrangement of tubing where there is an inner tube located inside of an outer tube in concentric fashion.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. The use of the term "comprising" in the specification and the claims includes the more narrow language of "consisting essentially of" and "consisting of."

Embodiments are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

As used herein, "about" is intended to correspond to ±5% of the stated value.

Disclosed herein is an improved valve block design and system therefor that can be used to improve the purging efficiency for drying all wetted surfaces that are connected between either a chemical container and a manifold or between a pair of manifolds. The improved valve block design includes several features that can be used to significantly reduce the time required to purge all wetted surfaces within a system. The valve block design eliminates or introduces only minimal deadlegs and provides for full impingement on any minimal deadlegs. It also allows for a substantial reduction in the length of the vent path, and therefore a substantial reduction in the total quantity of surface area of conduit that becomes wetted with liquid chemical.

The valve block disclosed herein comprises a housing (114) having a first side (116) and a second side (126) opposite the first side (116), wherein the first side (116) comprises a cylindrical depression (118) for receiving a valve control mechanism, wherein the cylindrical depression (118) comprises a surface (120) and a first opening (122) and a second opening (124) in the surface (120), each of which are terminal ends of conduits, wherein the first opening is in fluid communication with a T-connection (146) in fluid communication with a second conduit (148) having a first portion (150) and a second portion (152), wherein the second opening (124) is in fluid communication with a vent opening (178) located on the second side (126) of the housing (114); a third side (128) adjacent to the first side (116) and a fourth side (138) opposite the third side (128), wherein the third side (128) comprises a cylindrical depression (130) for receiving a valve control mechanism, wherein the cylindrical depression (130) comprises a surface (132) and a first opening (134) and a second opening (136) in the surface, each of which are terminal ends of conduits, wherein the first opening (134) is in fluid communication with the first portion (150) of the second conduit (148) and the second opening (136) is in fluid communication with an opening (204) located on the fourth side (138) of the housing (114); a fifth side (140) and a sixth side (142) opposite the fifth side (140), wherein the second portion (152) of the second conduit (148) is in fluid communication with an opening (166) located on the fifth side (140) of the housing (114) through a conduit via a bend portion (162); and an angled seventh side (158) adjacent to the first side (116) and the fourth side (138), wherein the angled seventh side (158) comprises a cylindrical depression (154) for receiving a valve control mechanism, wherein the cylindrical depression (154) comprises a surface (184) and a first opening (174) and a second opening (176) in the surface (184), each of which are terminal ends of conduits, wherein the first opening (174) is in fluid communication with an opening (208) through conduit portion (194) via bend (196) located on the fifth side (140) of the housing (114), the second opening (176) is in fluid communication with the opening (206) located on the second side (126) of the housing (114) through conduit (186) via bend (190) and conduit portion (188).

The valve block according to embodiments disclosed herein accomplishes these improvements by having a triad of valves located within a single valve block or housing, two of the valve seats being oriented at a 90 degree difference relative to each other (e.g., on adjacent surfaces of a housing that is in the shape of a rectangular prism) while the third is located independently on another side. When used in a system in which the valve block is connected to a host container, the presence of the triad of valves ensures that all deadlegs are fully impinged upon during a purge step, thereby permitting a more efficient purge process. Specifically, the conduit through which purge gas enters the system is coaxially aligned with the port opening that is in fluid flow communication with the container. Because this port opening is closed during the purge process, the minimal deadleg located coaxially to this port opening is fully impinged upon by the purge gas when said port opening is closed. Accordingly, less purge gas can be used, the purge process can occur more quickly, and energy savings can be realized. This is contrasted with known prior art systems (see FIGS. 1 and 2), in which the valve seats are further from the container opening. In addition, locating the valves in a single valve block allows the liquid (vent) path to be kept very short, thereby greatly reducing the quantity of conduit surface area that becomes wetted and therefore must be dried. This is contrasted with a known prior art system (see FIG. 2), which has a comparably much longer liquid (vent) path that must be dried.

FIG. 1 is a visual representation of a prior art system 10 comprising a solvent source 66 in fluid flow communication with a conduit 40 which is in fluid flow communication with valve 38. Valve 38 is in fluid flow communication with conduit 17 via connection 16 which is in fluid flow communication with conduit 15 via bend 26. Conduit 15 is in fluid flow communication with the internal coaxial portion of coax injector 36 and in fluid flow communication with container 30 via conduit 29.

A fluid flow outlet 60 in fluid flow communication with a conduit 59 which is in fluid flow communication with valve 68. Valve 68 is in fluid flow communication with conduit 47 via connection 46. Conduit 47 is in fluid flow communication with the external coaxial portion of coax injector 36 and in fluid flow communication with container 30 via conduit 29.

Figure 2:
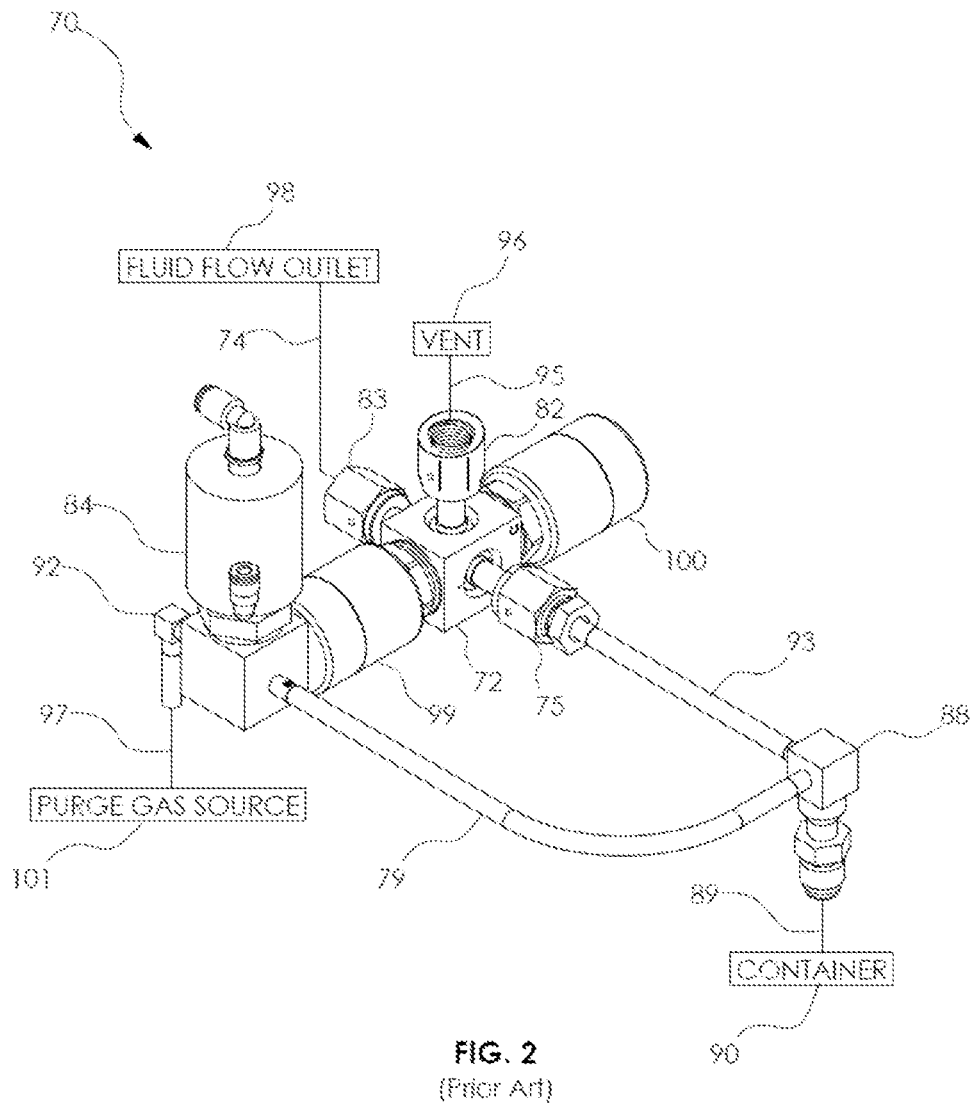
FIG. 2 illustrates a prior art high-pressure purge manifold to host container manifold system comprising two independent valves consisting of three independent valve control mechanisms and a coax injector connection.

FIG. 2 is a visual representation of a prior art system 70 comprising a purge source 101 in fluid flow communication with a conduit 97 which is in fluid flow communication with valve 84 via bend 92. Valve 84 is in fluid flow communication with conduit 79 and is in fluid flow communication with the internal coaxial portion of coax injector 88 and in fluid flow communication with container 90 via conduit 89.

A fluid flow outlet 98 in fluid flow communication with a conduit 74 which is in fluid flow communication with valve 72 via connection 83. Valve 72 is dual actuated to control individual ports connections 82, 83 via actuators 99, 100. During this operation, actuator 99 is open and 100 is closed to allow fluid flow communication to connection 75 and is in fluid flow communication with conduit 93. Conduit 93 is in fluid flow communication with the external coaxial portion of coax injector 88 and in fluid flow communication with container 90 via conduit 89.

A vent 96 in fluid flow communication with a conduit 95 which is in fluid flow communication with valve 72 via connection 82. Valve 72 is dual actuated to control individual ports connections 82, 83 via actuators 99, 100. During this operation, actuator 100 is open and 99 is closed to allow fluid flow communication to connection 75 and is in fluid flow communication with conduit 93. Conduit 93 is in fluid flow communication with the external coaxial portion of coax injector 88 and in fluid flow communication with container 90 via conduit 89.

Figure 3:
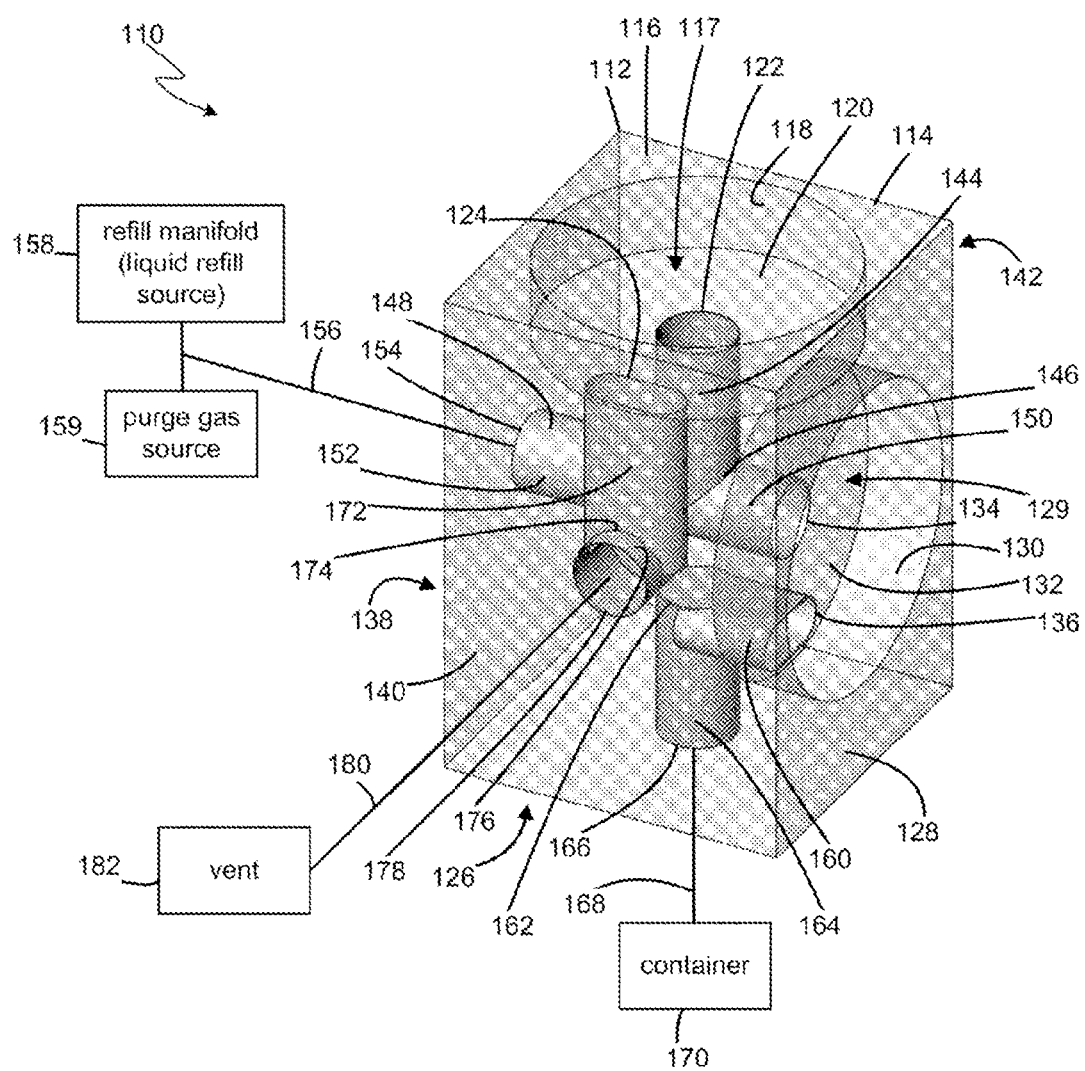
FIG. 3 illustrates yet another prior art system comprising a valve block with dual valve control mechanisms.

The valve block shown in prior art FIG. 3 is disclosed in U.S. Pat. No. 10,663,072, which is incorporated herein by reference. The valve block shown in prior art FIG. 3 is a refill manifold to host container manifold system 110 comprising an improved valve block 112 according to the present invention will now be described in detail.

The valve block 112 according to the present invention comprises a housing 114 that is approximately a rectangular prism in shape, although other housing shapes are possible within the scope of this invention, including generally cubic, spherical, or ovoid shapes or irregular shapes. In this embodiment, the housing 114 comprises a first side 116 that includes a valve seat 117 comprising a cylindrical depression 118. The cylindrical depression 118 comprises a surface 120 at which openings 122,124 terminate and a second side 126 that opposes the first side 116. The cylindrical depression 118 accommodates the placement of a valve control mechanism therein (not shown). The valve control mechanism allows for selective opening and closing of the opening 122 via a diaphragm that is fully engageable with the opening 122.

The opening 122 is connected in fluid flow communication to a conduit portion 144, which is connected in fluid flow communication to a T-connection 146. The T-connection 146 is also connected in fluid flow communication with a conduit portion 148 that comprises a first portion 150 and a second portion 152. The valve block 112 further comprises a third side 128 that includes a valve seat 129 comprising a cylindrical depression 130. The cylindrical depression 130 comprises a surface 132 at which openings 134,136 terminate, a fourth side 138 that opposes the third side 128, a fifth side 140, and a sixth side 142 that opposes the fifth side 140. The cylindrical depression 130 accommodates the placement of a second valve control mechanism therein (not shown). The second valve control mechanism is used to selectively open and close the opening 134 via a diaphragm that is fully engageable with the opening 134. Opening 134 is in fluid flow communication with the first portion 150 of the conduit portion 148 and opening 136 is in fluid flow communication with conduit portion 160. In this embodiment, the cylindrical depressions 118,130 of the valve seats 117,129 that accommodate attachment of the valve control mechanisms are located on adjacent sides of the housing 114 (i.e., first side 116 and third side 128), the openings 134,154 are axially aligned, i.e., the center points of the openings 134,154 are aligned along the same linear axis (via a line that could be drawn through the center of the volume of conduit portion 148).

The second portion 152 of the conduit portion 148 is in fluid flow communication with an opening 154 located on the fourth side 138 of the valve block 112, and the opening 154 is in fluid flow communication with both a refill manifold 158 and a purge gas source 159 via connection 156. Conduit portion 160 is in fluid flow communication with conduit portion 164 via bend 162, and conduit portion 164 is in fluid flow communication with opening 166 located on the second side 126 of the housing 114. Opening 166 is in fluid flow communication with container 170 via connection 168. Opening 124 located on surface 120 of cylindrical depression 118 is in fluid flow communication with conduit portion 172, which is in fluid flow communication with conduit portion 176 via bend 174. Conduit portion 176 is in fluid flow communication with opening 178 located on fifth side 140 of the housing 114 and opening 178 is in fluid flow communication with vent 182 via connection 180. In this embodiment, T-connection 146 and bends 162,174 orient respective connected conduit portions at 90 degree angles. It should be understood that in alternate embodiments, the T-connection 146 and/or bends 162,174 need not orient respective connected conduit portions at 90 degree angles but could instead orient respective connected conduit portions at any angle from 30 to 135 degrees.

The valve block disclosed in U.S. Pat. No. 10,663,072, however, still suffers from the drawback of only being move liquids or gas through three ports controlled by two actuators. While the current invention can move liquids or gas through four ports controlled by three individual actuators. In addition to the advanced port control, the present invention can feed purge gas directly in the container connection, the fluid flow path, and the vent due to the use of a coaxial tube within the valve block. The smaller tube inside of the coax portion of the valve concentrates the pressure of the purge gas to higher pressures which allows for quicker purging of the valve block. The present disclosure builds on that disclosed in U.S. Pat. No. 10,663,072.

Referring now to FIGS. 4 to 10, a purge manifold to host container manifold system 110 comprising an improved valve block 112 according to the present invention will now be described in detail.

The valve block 112 according to the present invention comprises a housing 114 that is a multi-sided object, although other housing shapes are possible within the scope of this invention, including generally cubic, spherical, rectangular, ovoid shapes or other irregular shapes. In this embodiment, the housing 114 comprises a first side 116 that includes a valve seat 117 comprising a cylindrical depression 118. The cylindrical depression 118 comprises a surface 120 at which openings 122, 124 terminate and a second side 126 that opposes the first side 116. The cylindrical depression 118 accommodates the placement of a valve control mechanism therein (not shown). The valve control mechanism allows for selective opening and closing of the opening 122 via a diaphragm this is fully engageable with the opening 122.

The opening 122 is connected in fluid flow communication to a conduit portion 144, which is connected in fluid flow communication to at T-connection 146. The T-connection 146 is also connected in fluid flow communication with a conduit portion 148 that comprises a first portion 150 and a second portion 152. The valve block 112 further comprises a third side 128 that includes a valve seat 129 comprising a cylindrical depression 130. The cylindrical depression 130 comprises a surface 132 at which openings 134, 136 terminate, a fourth side 138 that opposes the third side 128, a fifth side 140, and sixth side 142 that opposes the fifth side 140. The cylindrical depression 130 accommodates the placement of the second valve control mechanism therein (not shown). The second valve control mechanism is used to selectively open and close the opening 134 with, for example, a diaphragm. Opening 134 is in fluid flow communication with the first portion 150 of the conduit portion 148 and opening 136 is in fluid communication with conduit portion 198. Conduit portion 198 is in fluid flow communication with opening 204 located on the fourth side 138 of the housing 114 and opening 204 is in fluid flow communication with fluid flow outlet 202 via connection 200. In this embodiment, the cylindrical depressions 118, 130 of the valve seats 117, 129 that accommodate attachment of the valve control mechanisms are located on adjacent (i.e., first side 116 and third side 128), instead of opposing sides of the housing of the valve block as shown in the prior art embodiments on FIG. 2.

Conduit portion 148 is in fluid flow communication with conduit portion 164 via bend 162, and conduit portion 164 is in fluid flow communication with opening 166 located on the fifth side 140 of the housing 114. Opening 166 is in fluid flow communication with a face seal fitting 187 via a reducing conduit 189 and is in fluid flow communication with coaxial conduit portion 185 which is in fluid flow communication with opening 208. Opening 208 is in fluid flow communication with container 170 via connection 168. Opening 124 located on surface 120 of cylindrical depression 118 is in fluid flow communication with conduit portion 172. Conduit portion 172 is in fluid flow communication with opening 178 located on the second side 126 of the housing 114 and opening 178 is in fluid flow communication with vent 182 via connection 180.

Additionally, the valve block 112 comprises of an angled seventh side 158 that includes a valve seat 131 comprising a cylindrical depression 154. The cylindrical depression 154 comprises a surface 184 at which openings 174, 176 terminate, the second side 126 that opposes the first side 116. The cylindrical depression 154 accommodates the placement of the third valve control mechanism therein (not shown). The third valve control mechanism is used to selectively open and close the opening 174. Opening 174 is in fluid flow communication with the conduit portion 192. Conduit portion 192 is in fluid flow communication with conduit portion 194 via bend 196. Conduit portion 194 is in fluid flow communication with outer coaxial conduit portion 185 (outer portion) and conduit portion 168 to the container 170 via the inner coaxial portion 183 (inner portion) located inside the face seal fitting 187. and opening 176 is in fluid flow communication with conduit portion 186. Conduit portion 186 is in fluid flow communication with conduit portion 188 via bend 190, and conduit portion 188 is in fluid flow communication with opening 206 located on the second side 126 of the housing 114 and is in fluid flow communication with a purge gas source 159 via connection 156.

In the system 110 of FIGS. 4 to 10 during normal fluid flow operation, valve control mechanism (not shown) in cylindrical depression 130 is open. This allows fluid to flow from container 170 through conduit 168 and through opening 208 into conduit 185. Conduit 185 is the outer coaxial portion of face seal 187, which allows fluid to flow through opening 166 and into conduits 164 and 148. With the valve control mechanism open (not shown) fluid can flow through opening 134 and into opening 136 so it can make its way out of opening 204 to fluid flow outlet 202 via conduit 198 and 200.

When container 170 is empty and needs to be changed. The valve control mechanism (not shown) in cylindrical depression 130 (third side) is closed. This closes opening 134 and isolates the wetted system from the area that is intended to be purged. Valve control mechanisms (not shown) in cylindrical depressions 154 and 118 both open to allow the purge cycle to begin. Purge gas source 159 feeds purge gas through opening 206 via conduit 156 and through conduits 188 and 186. With the valve control mechanism open (not shown) fluid can flow through opening 174 and into opening 176 so it travel through conduit 192 and 196 to exit the inner coaxial portion 183. The valve control mechanism (not shown) on the container will be closed and this purge step forces high pressure purge gas to blast fluid molecules off the connection of opening 208 and forces and back up the outer coaxial conduit 185. Conduit 185 is the outer coaxial portion of face seal 187, which allows purge gas and fluid particles to flow through opening 166 and into conduits 164 and 148. With the valve control mechanism of cylindrical depression 118 open (not shown) purge gas and fluid particles can flow through opening 122 and into opening 124 so it can make its way out of opening 178 to vent 182 via conduit 172 and 180.

Thus, disclosed herein is a system comprising: a valve block comprising: a housing (114) having a first side (116) and a second side (126) opposite the first side (116), wherein the first side (116) comprises a cylindrical depression (118) for receiving a valve control mechanism, wherein the cylindrical depression (118) comprises a surface (120) and a first opening (122) and a second opening (124) in the surface (120), each of which are terminal ends of conduits, wherein the first opening is in fluid communication with a T-connection (146) in fluid communication with a second conduit (148) having a first portion (150) and a second portion (152), wherein the second opening (124) is in fluid communication with a vent opening (178) located on the second side (126) of the housing (114); a first valve control mechanism located the cylindrical depression (118) of the first side (116); a third side (128) adjacent to the first side (116) and a fourth side (138) opposite the third side (128), wherein the third side (128) comprises a cylindrical depression (130) for receiving a valve control mechanism, wherein the cylindrical depression (130) comprises a surface (132) and a first opening (134) and a second opening (136) in the surface, each of which are terminal ends of conduits, wherein the first opening (134) is in fluid communication with the first portion (150) of the second conduit (148) and the second opening (136) is in fluid communication with an opening (204) located on the fourth side (138) of the housing (114); a second valve control mechanism located the cylindrical depression (130) of the third side (128); a fifth side (140) and a sixth side (142) opposite the fifth side (140), wherein the first portion (150) of the second conduit (148) is in fluid communication with an opening (166) located on the fifth side (140) of the housing (114) via a bend portion (162); an angled seventh side (158) adjacent to the first side (116) and the fourth side (138), wherein the angled seventh side (158) comprises a cylindrical depression (154) for receiving a valve control mechanism, wherein the cylindrical depression (154) comprises a surface (184) and a first opening (174) and a second opening (176) in the surface (184), each of which are terminal ends of conduits, wherein the first opening (174) is in fluid communication with an opening (208) through conduit portion (194) via bend (196) located on the fifth side (140) of the housing (114), the second opening (176) is in fluid communication with the opening (206) located on the second side (126) of the housing (114) through conduit (186) via bend (190) and conduit portion (188); and a third valve control mechanism located the cylindrical depression (154) of the angled seventh side (158).

Thus, also disclosed herein is a method of performing a purge step in a valve block after the valve block has undergone a fluid flow step, wherein the valve block is in fluid communication with a container, the valve block comprising: a housing (114) having a first side (116) and a second side (126) opposite the first side (116), wherein the first side (116) comprises a cylindrical depression (118) for receiving a valve control mechanism, wherein the cylindrical depression (118) comprises a surface (120) and a first opening (122) and a second opening (124) in the surface (120), each of which are terminal ends of conduits, wherein the first opening is in fluid communication with a T-connection (146) in fluid communication with a second conduit (148) having a first portion (150) and a second portion (152), wherein the second opening (124) is in fluid communication with a vent opening (178) located on the second side (126) of the housing (114); a first valve control mechanism located the cylindrical depression (118) of the first side (116); a third side (128) adjacent to the first side (116) and a fourth side (138) opposite the third side (128), wherein the third side (128) comprises a cylindrical depression (130) for receiving a valve control mechanism, wherein the cylindrical depression (130) comprises a surface (132) and a first opening (134) and a second opening (136) in the surface, each of which are terminal ends of conduits, wherein the first opening (134) is in fluid communication with the first portion (150) of the second conduit (148) and the second opening (136) is in fluid communication with an opening (204) located on the fourth side (138) of the housing (114); a second valve control mechanism located the cylindrical depression (130) of the third side (128); a fifth side (140) and a sixth side (142) opposite the fifth side (140), wherein the first portion (150) of the second conduit (148) is in fluid communication with an opening (166) located on the fifth side (140) of the housing (114) via a bend portion (162); an angled seventh side (158) adjacent to the first side (116) and the fourth side (138), wherein the angled seventh side (158) comprises a cylindrical depression (154) for receiving a valve control mechanism, wherein the cylindrical depression (154) comprises a surface (184) and a first opening (174) and a second opening (176) in the surface (184), each of which are terminal ends of conduits, wherein the first opening (174) is in fluid communication with an opening (208) through conduit portion (194) via bend (196) located on the fifth side (140) of the housing (114), the second opening (176) is in fluid communication with the opening (206) located on the second side (126) of the housing (114) through conduit (186) via bend (190) and conduit portion (188), wherein the opening (206) located on the second side (126) of the housing (114) is in fluid communication with a purge gas source (159); and a third valve control mechanism located the cylindrical depression (154) of the angled seventh side (158); the method comprising the steps of: changing the container; engaging the second valve control mechanism to close the first opening (134) in the surface (132) of the cylindrical depression (130) in the third side (128) and to isolate the second opening (136) in the surface (132) of the cylindrical depression (130) in the third side (128); disengaging the first valve control mechanism to open the first opening (122) in the surface (120) of the cylindrical depression (118) in the first side (116) and to open the second opening (124) in the surface (120) of the cylindrical depression (118) in the first side (116); disengaging the third valve control mechanism to open the first opening (174) in the surface (184) of the cylindrical depression (154) in the angled seventh side (158) and to open the second opening (176) in the surface (184) of the cylindrical depression (154) in the angled seventh side (158); and flowing high pressure purge gas through the opening (206) located on the second side (126) of the housing (114) such that the purge gas flows through the second opening (176) in the surface (184) of the cylindrical depression (154) in the angled seventh side (158) then through the first opening (174) in the surface (184) of the cylindrical depression (154) in the angled seventh side (158) to exit the inner coaxial portion (183) of the coaxial conduit and back up the outer coaxial portion (185) of the coaxial conduit through the first opening (122) in the surface (120) of the cylindrical depression (118) in the first side (116) and into the second opening (124) in the surface (120) of the cylindrical depression (118) in the first side (116) to the vent opening (178) located on the second side (126) of the housing (114).

Figure 4:
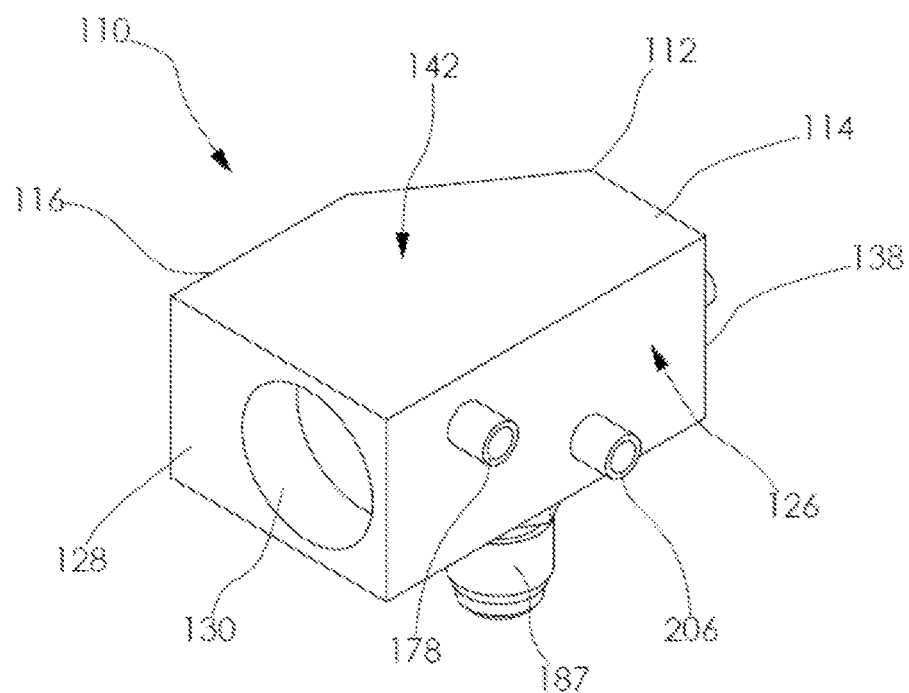
FIG. 4 illustrates a valve block of the present invention.
Figure 5:
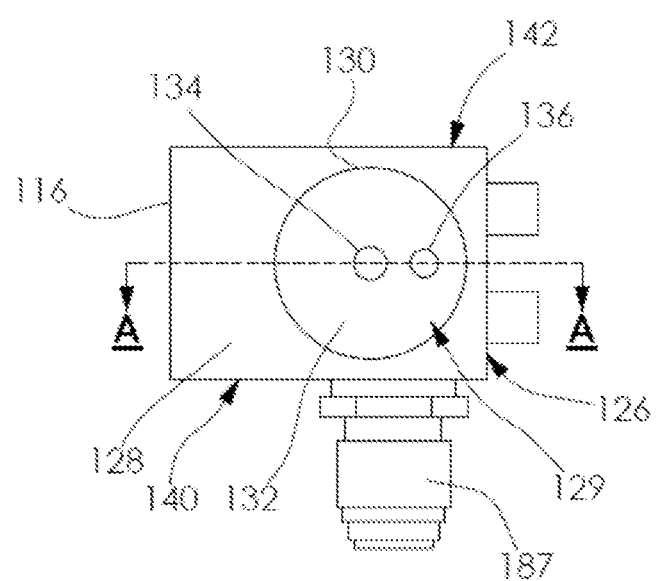
FIG. 5 is an axial view of the valve block of FIG. 4.
Figure 6:
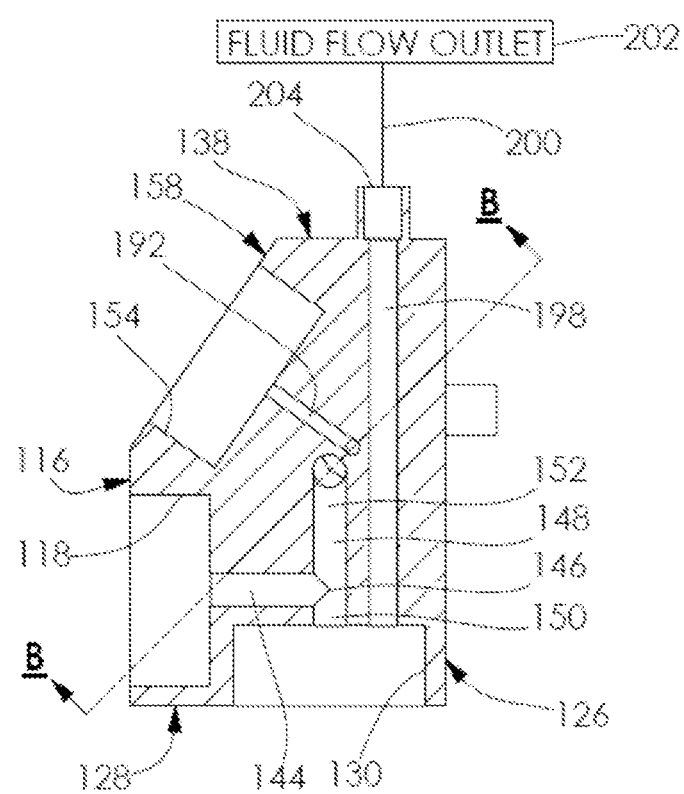
FIG. 6 is a view of the valve block of FIG. 5 cut along line A-A.
Figure 7:
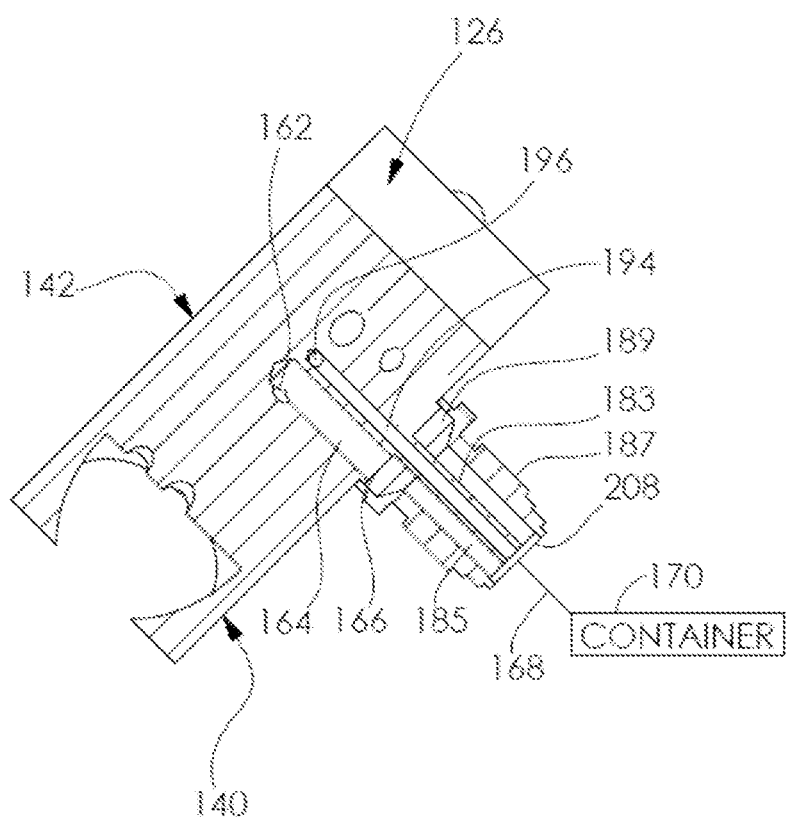
FIG. 7 is a view of the valve block of FIG. 6 cut along line B-B.
Figure 8:
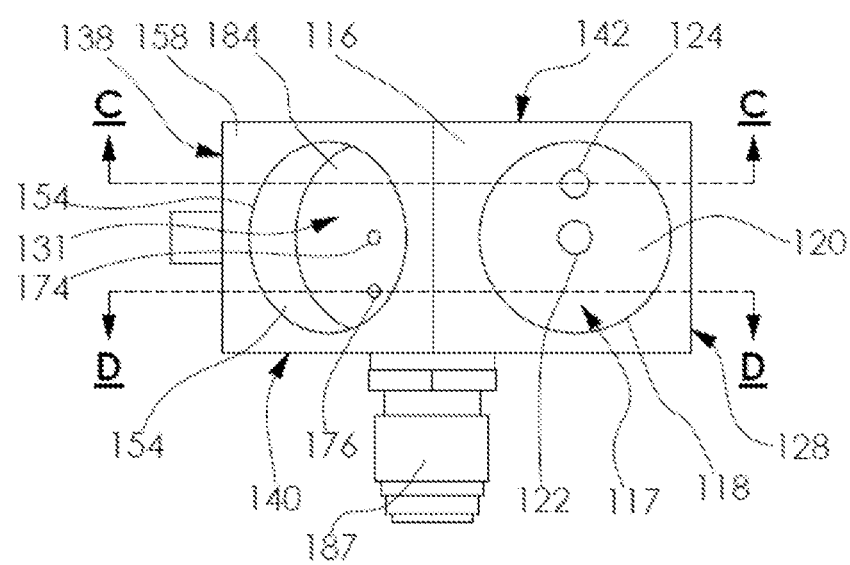
FIG. 8 is another view of the valve block of FIG. 4.
Figure 9:
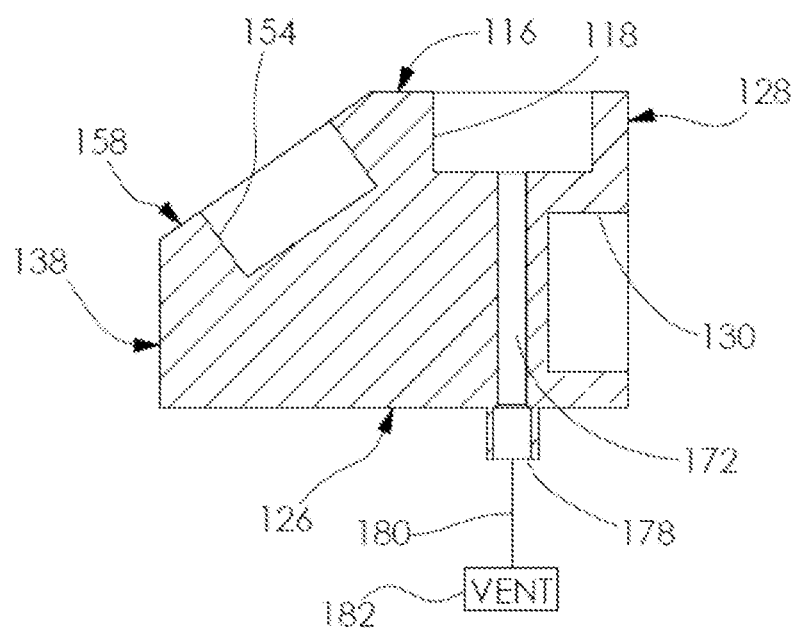
FIG. 9 is a view of the valve block of FIG. 8 cut along line C-C.
Figure 10:
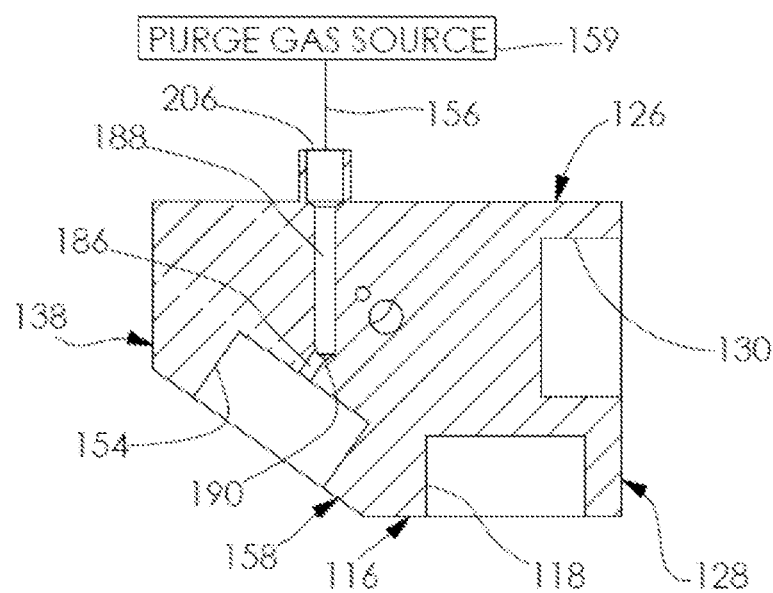
FIG. 10 is a view of the valve block of FIG. 8 cut along line D-D.
Figure 11:
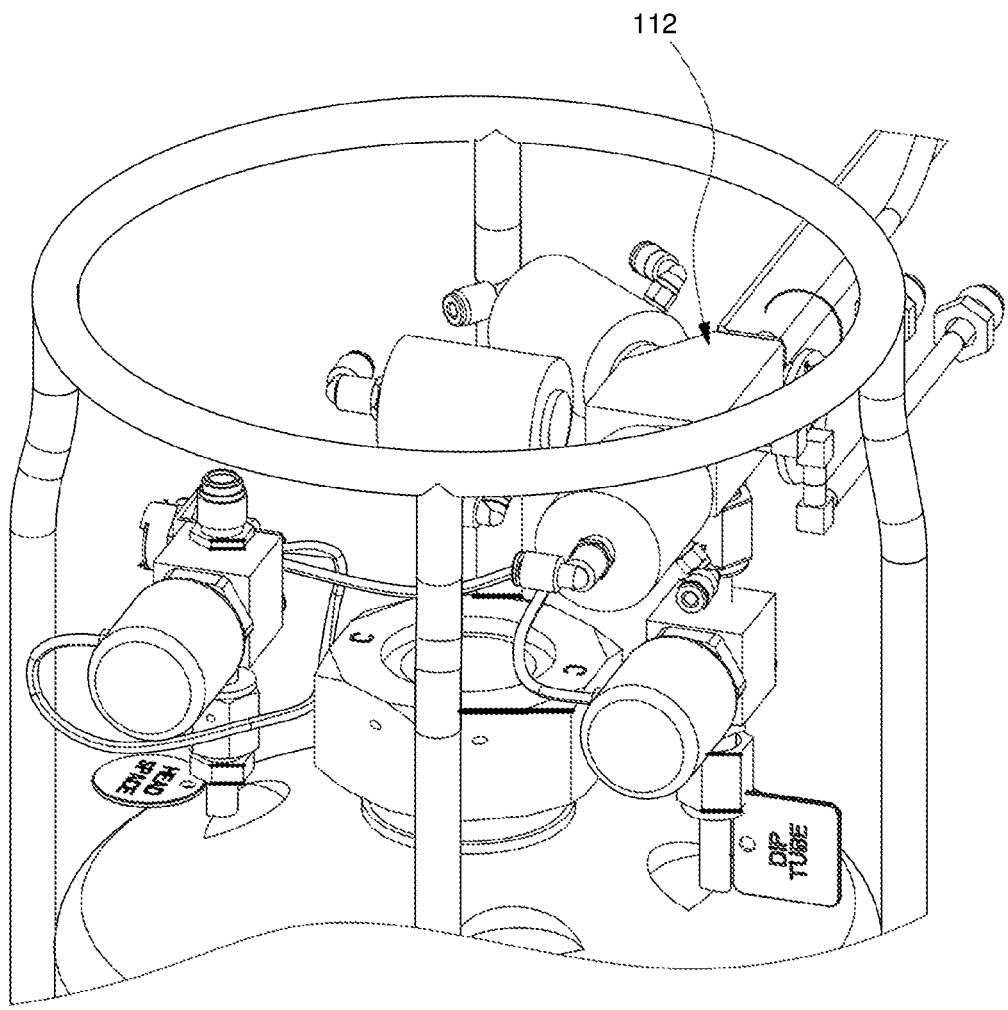
FIG. 11 is an illustration of the valve block of the present invention in relation to its installation point on the container, underneath a chimering.

Unlike prior art system 10 shown in FIG. 1, when the system 110 of FIG. 4 needs to change the container, it does not need to use a dangerous solvent source. The use of high-pressure purge gas is to accomplish the same task reduces the change of hazardous chemical exposure in the system and reduces the waste stream of disposing of hazardous chemicals.

Also, unlike prior art system 70 shown in FIG. 2, system 110 of FIGS. 4 to 10 does not require the additional conduit, valves and a separate coaxial injector. System 110 of FIGS. 4 to 10 takes all these separate components and combines them into one small valve block. The advantage of this being a greatly reduced amount of wetted surfaces inside the valve block. This significantly decreases purge times and increases the rate at which a container can be changed.

Additionally, unlike prior art system 110 shown in FIG. 3, when system 110 of FIGS. 4 to 10 performs a container change, the coaxial injector portion 187 can blast the connection between the valve block 112 and the container 170 with high pressure purge gas. This allows the same valve to vent the gas in the same step, as well as, deliver fluid in another step once the can change is complete. This is completed by incorporating three separate valve control mechanisms (not shown) into a single valve block while also taking advantage of a coaxial high-pressure purge device.

The invention claimed is:

1. A valve block comprising:
   a housing having a first side and a second side opposite the first side, wherein the first side comprises a cylindrical depression for receiving a valve control mechanism, wherein the cylindrical depression comprises a surface and a first opening and a second opening in the surface, each of which are terminal ends of conduits, wherein the first opening is in fluid communication with a T-connection in fluid communication with a second conduit having a first portion and a second portion, wherein the second opening is in fluid communication with a vent opening located on the second side of the housing;
   a third side adjacent to the first side and a fourth side opposite the third side, wherein the third side comprises a cylindrical depression for receiving a valve control mechanism, wherein the cylindrical depression comprises a surface and a first opening and a second opening in the surface, each of which are terminal ends of conduits, wherein the first opening is in fluid communication with the first portion of the second conduit and the second opening is in fluid communication with an opening located on the fourth side of the housing;
   a fifth side and a sixth side opposite the fifth side, wherein the second portion of the second conduit is in fluid communication with an opening located on the fifth side of the housing through a conduit via a bend portion; and
   an angled seventh side adjacent to the first side and the fourth side, wherein the angled seventh side comprises a cylindrical depression for receiving a valve control mechanism, wherein the cylindrical depression comprises a surface and a first opening and a second opening in the surface, each of which are terminal ends of conduits, wherein the first opening is in fluid communication with an opening through conduit portion via bend located on the fifth side of the housing, the second opening is in fluid communication with the opening located on the second side of the housing through conduit via bend and conduit portion.

2. The valve block of claim 1 wherein the opening in the fourth side of the housing is in fluid communication with a fluid flow outlet via a connection.

3. The valve block of claim 2 wherein the opening on the fifth side is in fluid communication with a face seal fitting via a reducing conduit and is in fluid communication with the coaxial conduit, which is in fluid communication with the opening located on the fifth side of the housing.

4. The valve block of claim 3 wherein the opening located on the fifth side of the housing is in fluid communication with a container via a connection.

5. The valve block of claim 1 wherein the opening located on the second side of the housing is in fluid communication with a purge gas source.

6. The valve block of claim 1 wherein the T-connection comprises a 90° angle.

7. The valve block of claim 1 wherein the T-connection comprises an angle from 30° to 135°.

8. A system comprising:
   a valve block comprising:
      a housing having a first side and a second side opposite the first side, wherein the first side comprises a cylindrical depression for receiving a valve control mechanism, wherein the cylindrical depression comprises a surface and a first opening and a second opening in the surface, each of which are terminal ends of conduits, wherein the first opening is in fluid communication with a T-connection in fluid communication with a second conduit having a first portion and a second portion, wherein the second opening is in fluid communication with a vent opening located on the second side of the housing;
      a first valve control mechanism located the cylindrical depression of the first side;
      a third side adjacent to the first side and a fourth side opposite the third side, wherein the third side comprises a cylindrical depression for receiving a valve control mechanism, wherein the cylindrical depression comprises a surface and a first opening and a second opening in the surface, each of which are terminal ends of conduits, wherein the first opening is in fluid communication with the first portion of the second conduit and the second opening is in fluid communication with an opening located on the fourth side of the housing;
      a second valve control mechanism located the cylindrical depression of the third side;
      a fifth side and a sixth side opposite the fifth side, wherein the first portion of the second conduit is in fluid communication with an opening located on the fifth side of the housing via a bend portion;
      an angled seventh side adjacent to the first side and the fourth side, wherein the angled seventh side comprises a cylindrical depression for receiving a valve control mechanism, wherein the cylindrical depression comprises a surface and a first opening and a second opening in the surface, each of which are terminal ends of conduits, wherein the first opening is in fluid communication with an opening through conduit portion via bend located on the fifth side of the housing, the second opening is in fluid communication with the opening located on the second side of the housing through conduit via bend and conduit portion; and
      a third valve control mechanism located the cylindrical depression of the angled seventh side.

9. The system of claim 8 wherein the opening in the fourth side of the housing is in fluid communication with a fluid flow outlet via a connection.

10. The system of claim 9 wherein the opening on the fifth side is in fluid communication with a face seal fitting via a reducing conduit and is in fluid communication with the coaxial conduit, which is in fluid communication with the opening located on the fifth side of the housing.

11. The system of claim 10 wherein the opening located on the fifth side of the housing is in fluid communication with a container via a connection.

12. The system of claim 8 wherein the opening located on the second side of the housing is in fluid communication with a purge gas source.

13. The system of claim 8 wherein the T-connection comprises a 90° angle.

14. The system of claim 8 wherein the T-connection comprises an angle from 30° to 135°.

15. A method of performing a purge step in a valve block after the valve block has undergone a fluid flow step, wherein the valve block is in fluid communication with a container, the valve block comprising:

a housing having a first side and a second side opposite the first side, wherein the first side comprises a cylindrical depression for receiving a valve control mechanism, wherein the cylindrical depression comprises a surface and a first opening and a second opening in the surface, each of which are terminal ends of conduits, wherein the first opening is in fluid communication with a T-connection in fluid communication with a second conduit having a first portion and a second portion, wherein the second opening is in fluid communication with a vent opening located on the second side of the housing;

a first valve control mechanism located the cylindrical depression of the first side;

a third side adjacent to the first side and a fourth side opposite the third side, wherein the third side comprises a cylindrical depression for receiving a valve control mechanism, wherein the cylindrical depression comprises a surface and a first opening and a second opening in the surface, each of which are terminal ends of conduits, wherein the first opening is in fluid communication with the first portion of the second of the second conduit is in fluid communication with an opening located on the fifth side of the housing via a bend portion;

an angled seventh side adjacent to the first side and the fourth side, wherein the angled seventh side comprises a cylindrical depression for receiving a valve control mechanism, wherein the cylindrical depression comprises a surface and a first opening and a second opening in the surface, each of which are terminal ends of conduits, wherein the first opening is in fluid communication with an opening through conduit portion via bend located on the fifth side of the housing, the second opening is in fluid communication with the opening located on the second side of the housing through conduit via bend and conduit portion, wherein the opening (206) located on the second side of the housing is in fluid communication with a purge gas source; and a third valve control mechanism located the cylindrical depression of the angled seventh side;

the method comprising the steps of:

changing the container;

engaging the second valve control mechanism to close the first opening in the surface of the cylindrical depression in the third side and to isolate the second opening in the surface of the cylindrical depression in the third side;

disengaging the first valve control mechanism to open the first opening in the surface of the cylindrical depression in the first side and to open the second opening in the surface of the cylindrical depression in the first side;

disengaging the third valve control mechanism to open the first opening in the surface of the cylindrical depression in the angled seventh side and to open the second opening in the surface of the cylindrical depression in the angled seventh side; and flowing high pressure purge gas through the opening located on the second side of the housing such that the purge gas flows through the second opening in the surface of the cylindrical depression in the angled seventh side then through the first opening in the surface of the cylindrical depression in the angled seventh side to exit the inner coaxial portion of the coaxial conduit and back up the outer coaxial portion of the coaxial conduit through the first opening in the surface of the cylindrical depression in the first side and into the second opening in the surface of the cylindrical depression in the first side to the vent opening located on the second side of the housing.

16. The method of claim 15 wherein the opening in the fourth side of the housing is in fluid communication with a fluid flow outlet via a connection.

17. The method of claim 16 wherein the opening on the fifth side is in fluid communication with a face seal fitting via a reducing conduit and is in fluid communication with the coaxial conduit, which is in fluid communication with the opening located on the fifth side of the housing.

18. The method of claim 17 wherein the opening located on the fifth side of the housing is in fluid communication with a container via a connection.

19. The method of claim 15 wherein the opening located on the second side of the housing is in fluid communication with a purge gas source.

20. The method of claim 15 wherein the T-connection comprises a 90° angle.

21. The method of claim 15 wherein the T-connection comprises an angle from 30° to 135°.

* * * * *